United States Patent [19]

Leete

[11] 3,838,294
[45] Sept. 24, 1974

[54] MONITOR FOR REPETITIVE PULSE FORMING CIRCUIT

[75] Inventor: Bernard D. Leete, Newtown Square, Pa.

[73] Assignee: General Electric Company, Philadelphia, Pa.

[22] Filed: Sept. 27, 1973

[21] Appl. No.: 401,486

[52] U.S. Cl. ............. 307/233, 307/293, 340/248 P, 340/253 Y, 340/409
[51] Int. Cl. .......................................... G08b 21/00
[58] Field of Search ........ 340/248 R, 248 P, 253 Y, 340/237 S, 409; 307/233, 293

[56] References Cited
UNITED STATES PATENTS

| | | | |
|---|---|---|---|
| 3,149,243 | 9/1964 | Garfield | 307/233 X |
| 3,249,929 | 5/1966 | Sillers | 340/248 R |
| 3,304,490 | 2/1967 | Dubin et al. | 340/248 R X |
| 3,462,752 | 8/1969 | Stroh | 340/237 S |
| 3,703,717 | 11/1972 | Kuster | 340/253 Y |

Primary Examiner—John S. Heyman
Attorney, Agent, or Firm—J. Wesley Haubner; Albert S. Richardson, Jr.

[57] ABSTRACT

For monitoring the operation of a circuit that periodically supplies pulses of electric current to a connected load, a capacitor is connected in parallel with the load so as to be periodically charged to a voltage of appreciable magnitude. During the intermittent intervals between pulses, the capacitor partially discharges through a discharge circuit having a relatively long time constant. Voltage will therefore be continuously present on the capacitor so long as the operating frequency of the pulse forming circuit does not fall substantially below normal, and means responsive to this voltage provides an indication that the circuit is functioning properly.

12 Claims, 3 Drawing Figures

MONITOR FOR REPETITIVE PULSE FORMING CIRCUIT

This invention relates to means for monitoring the operation of a repetitive pulse forming network, and more particularly it relates to means for indicating that such a network is functioning properly.

Repetitive pulse forming networks are useful in the controls of static converters for electric power delivery systems. For example, it is a known practice to control the solid-state electric valves of an high voltage direct current (HVDC) converter by means of an optical firing scheme (see U.S. Pat. No. 3,355,600-Mapham). and in such a scheme it has heretofore been proposed to drive a parallel array of light emitting diodes by means of a pulse forming network (see my copending patent application Ser. No. 399,254). In such a setting there is a premium on high reliability and maximum availability, and therefore redundant components and circuits are commonly employed. To take advantage of such redundancy, it is desirable to monitor the various functions that are furnished in duplicate so that a first failure of one can be timely detected and corrected before the integrity of the whole system is impaired. One prior art approach to monitoring redundant light emitters is disclosed and claimed in my earlier U.S. Pat. No. 3,541,341.

It is a general objective of my present invention to provide improved means for monitoring the operation of a repetitive pulse forming network.

In carrying out my invention in one form, a capacitor is connected in parallel with a load circuit to which short pulses of electric current are periodically supplied by a pulse forming network, and each time such a pulse is formed it is charged to a voltage having an appreciable magnitude and a predetermined polarity. A resistor is connected in series with the capacitor to form a discharge circuit having a relatively long time constant so that during normal intervals between pulses the capacitor is partially discharged. So long as the repetition rate of consecutive pulses is higher than a predetermined frequency, the capacitor never fully discharges. Means responsive to the continuing presence across the capacitor of voltage of said predetermined polarity is provided for indicating that the pulse forming network is functioning properly. The latter means can comprise a neon light or the like and a switch operative to connect the light to the same d-c power supply that the pulse forming network uses, whereby the light will go out if the pulse forming network either malfunctions or loses its power supply.

My invention will be better understood and its various objects and advantages will be more fully appreciated from the following description taken in conjunction with the accompanying drawing in which.

Figure 1:
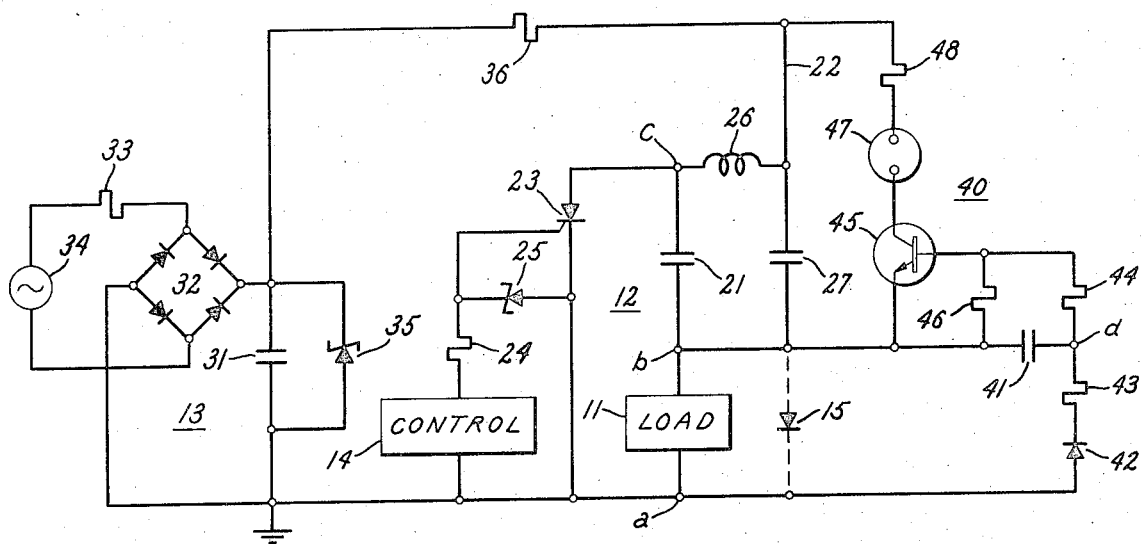
FIG. 1 is a schematic circuit diagram of a repetitive pulse forming network equipped with a monitor constructed in accordance with this invention.

Referring now to FIG. 1, there is shown a load circuit 11, a pulse forming network 12 for repeatedly supplying the load circuit with short pulses of electric current, a d-c power supply 13 from which these pulses are derived, and a source 14 of periodic control signals for triggering the network 12 at a desired frequency.

The load 11 comprises polarized circuitry or apparatus which is operatively energized by a pulse of input current entering the load from a terminal $a$ and leaving at a terminal $b$ each time the network 12 is triggered. By way of example, the load circuit could be a parallel array of light emitting diodes, as is disclosed in my above-mentioned copending patent application. Alternatively, it can comprise the primary winding of a multiple secondary pulse transformer which provides simultaneous gate pulses to a plurality of thyristors such as shown in U.S. Pat. No. 3,423,664-Dewey. In some instances the load circuit 11 may be shunted by an inversely poled diode 15.

The pulse forming network 12 is seen to comprise a first capacitor 21, a suitable circuit 22 for coupling the capacitor 21 in series circuit relationship with the load 11 to the d-c power supply 13 from which the first capacitor accumulates a charge, and a controllable switching means 23 connected in parallel with the series combination of the capacitor 21 and the load 11. The switching means 23 is preferably a thyristor which is periodically triggered or turned on by the control signals from the source 14. Its anode is connected to the relatively positive side $c$ of the capacitor 21, and its cathode is connected to the load terminal $a$.

In normal operation the source 14 applies to the gate electrode of thyristor 23 a train of discrete control signals of short duration and appreciable positive potential with respect to the cathode. These signals can be produced at a constant or a variable rate, depending on the desired frequency and timing of the input current pulses to the load 11. In any event, it will herein be assumed that the control signals have a predetermined normal frequency such as 60 Hz. A resistor 24 is connected between the gate of the thyristor 23 and the control signal source 14, and a zener diode 25 is connected as shown to prevent excessive potential on the gate.

The thyristor 23 is poled so that each time it is turned on by a control signal it provides a low-resistance path for discharging the precharged capacitor 21 through the load circuit 11. The resulting capacitor discharge current serves as the input current for operatively energizing the load. For subsequently turning off the thyristor 23, the pulse forming network 12 also includes suitable commutating means which is operative in delayed response to the turn on action. As it is illustrated in FIG. 1, the commutating means comprises a series combination of an inductor 26 and another capacitor 27 which combination is connected in parallel with the capacitor 21 and has a "ringing" effect. The parameters of the pulse forming network are chosen so that the thyristor 23 conducts for only a relatively short length of time (e.g., less than 1 millisecond). Thereafter, until the next control signal is received, the d-c power supply 13 recharges both of the capacitors 21 and 27.

As it is shown in FIG. 1, the d-c power supply 13 comprises energy storage means such as a capacitor 31 connected across the d-c terminals of a single-phase rectifier bridge 32 whose a-c terminals are connected via a resistor 33 to a source 34 of alternating voltage of relatively high amplitude. The capacitor 31 is shunted by a voltage regulating zener diode 35 which limits the voltage thereacross to a desired level (e.g., 200 volts). If desired, a battery could by used as the energy storage means, with the rectifier bridge 32 serving as a battery charger. The negative terminal of the power supply 13 is connected directly to the terminal $a$ of the load circuit 11 and is grounded. The relatively positive terminal of the power supply is connected through a resistor 36 to the recharging circuit 22 which in turn is connected to the junction of the inductor 26 and the capacitor 27. Parameters are chosen so that once the thyristor 23 turns off the capacitors 21 and 27 will recharge fully in a span of time corresponding to a predetermined fraction (e.g., approximately one-third) of the normal period between consecutive control signals.

In accordance with my present invention, operation of the repetitive pulse forming network 12 is monitored by a circuit 40 which will now be described. As it is shown in FIG. 1, the monitoring circuit 40 comprises a capacitor 41 which, by way of a diode 42 and a resistor 43, is connected in parallel with the load circuit 11. The diode 42 is poled so that each time the thyristor 23 is triggered to discharge the capacitor 21 of the pulse forming network through the load circuit 11, the capacitor 41 of the monitor 40 charges to a voltage having an appreciable magnitude and a predetermined polarity. To ensure fast charging of the capacitor 41, its charging circuit has a relatively short time constant. For example, the capacitor 41 can have a capacitance of approximately 0.02 microfarad and the resistor 43 can have a resistance of 100 ohms. The latter impedance is sufficient to prevent the monitoring circuit 40 from diverting an appreciable amount of input current from the load 11 when the thyristor 23 is turned on. The negative plate of the capacitor 41 is connected directly to the ungrounded load terminal $b$, and the positive plate of this capacitor is connected to a terminal $d$.

The monitor 40 further comprises a discharge circuit which enables the capacitor 41 to slowly discharge during the intervals when the thyristor 23 is off. The discharge circuit includes a resistor 44 and the emitter-base junction of an NPN transistor 45 in series with the capacitor 41. The resistor 44 has a high ohmic value (e.g., 1 megohm) which gives the discharge circuit a relatively long time constant, whereby the discharge circuit requires more time than the normal period between consecutive control signals to discharge fully the capacitor 41. The transistor 45 is part of means responsive to the charged state of the capacitor 41 for indicating that the pulse forming network is functioning properly.

The emitter of the transistor 45 is connected to the negative plate of the capacitor 41, and the emitter-base junction, which is shunted by a resistor 46, will therefore be forward biased so long as a positive voltage continues to be present at the terminal $d$. The indicating means includes an elements 47, such as the neon light that is illustrated in FIG. 1, for emitting a perceptible signal (e.g., light) when energized. The element 47, in series with a resistor 48 and the transistor 45, is connected across the capacitor 21 of the pulse forming network 12. Consequently the transistor 45 serves as a switch which is operative while forward biased to connect the element 47 for energization by the voltage on the capacitor 21.

In operation, the thyristor 23 of the pulse forming network 12 is periodically turned on to discharge the capacitor 21 through the load circuit 11, and each time this capacitor discharges the capacitor 41 of the monitoring circuit 40 is quickly recharged so that the potential of terminal $d$ is raised to a level appreciably more positive than terminal $b$. During the intermittent intervals when the thyristor 23 is off and the capacitor 21 is recharging, the capacitor 41 partially discharges through the resistor 44. So long as the rate at which the pulse forming network is triggered is higher than a predetermined frequency, the capacitor 41 is repeatedly recharged before it ever becomes fully discharged, and consequently a positive voltage is continuously present at the terminal $d$. In response to this voltage the transistor 45 remains forward biased, thereby maintaining an uninterrupted connection between the neon light 47 and the capacitor 21. Consequently the light is turned on to provide a perceptible signal which indicates that the pulse forming network is functioning properly.

Although in normal operation the capacitor 21 is cyclically discharged, the duration of its discharged state is relatively brief and the time ratio of its charged state to its discharged state is so high that the neon light 47 appears continuously illuminated to the human eye. However, in the abnormal event that the d-c power supply 13 fails or that the thyristor 23 does not turn off, the resulting loss of charge by the capacitor 21 will cause the neon light 47 to go out, thereby indicating a malfunction. If the source 14 were to stop applying control signals to the pulse forming network or if the thyristor 23 were to fail to turn on in response to a control signal, the capacitor 41 of the monitor 40 will soon become fully discharged, whereupon the transistor 45 turns off and the neon light 47 goes out even though the power supply is still intact. In either case, the absence of a perceptible signal from the neon light 47 indicates that the pulse forming network 12 is no longer supplying the load circuit 11 with periodic pulses of electric current.

Figure 2:
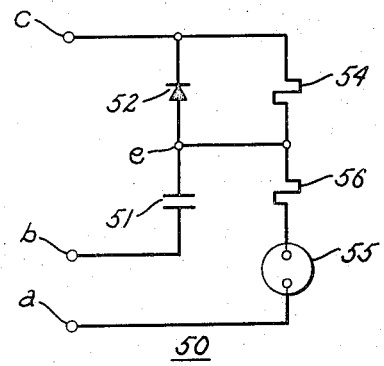
FIG. 2 is a schematic diagram of another circuit that can be used in lieu of the monitor shown in FIG. 1.

In FIG. 2 there is shown another version 50 of a monitoring circuit that can be used in lieu of the circuit 40 to monitor the pulse forming network of FIG. 1. As is indicated in FIG. 2, the monitoring circuit 50 comprises a capacitor 51 connected by way of a diode 52 across the terminals $b$ and $c$, whereby the capacitor 51 is disposed in parallel circuit relationship with the first capacitor 21 of the pulse forming network 12 (see FIG. 1). The diode 52 is poled so that each time a control signal triggers the thyristor 23 of the pulse forming network to discharge the capacitor 21 through the load circuit 11, the capacitor 51 of the monitor 50 abruptly discharges. This monitor further comprises a charging circuit which slowly restores charge on the capacitor 51 during the intervals between control signals when the capacitor 21 is recharging.

The charging circuit for the capacitor 51 includes a resistor 54 which is connected across the diode 52, and it also includes the d-c power supply 13 to which the terminal $c$ is coupled. It has a relatively long time constant, and an interval at least as long as the normal period between consecutive control signals is required to fully recharge the capacitor 51. Consequently the charging circuit is effective to continuously raise the voltage across this capacitor throughout the intermittent off intervals of the thyristor 23. An element 55, such as a neon light that emits a perceptible signal when energized, is connected in series with a resistor 56 between the relatively positive side $e$ of the capacitor 51 and the grounded terminal $a$. In this manner the neon light 55 is connected in parallel circuit relationship with the capacitor 51, and the intensity of its light signal will be proportional to the average magnitude of the voltage across this capacitor.

In normal operation of the monitor 50 shown in FIG. 2, the capacitor 51 is alternately discharged abruptly and recharged slowly. Consequently the neon light 55 is on continuously, but the light that it emits is at a relatively dim level of intensity which indicates that the pulse forming network is functioning properly. In the abnormal event that the source 14 stops applying control signals to the pulse forming network 12 or that the thyristor 23 fails to turn on in response to a control signal, the capacitor 51 will soon become fully charged to a level of voltage determined by the d-c power supply 13, and thereafter the neon light 55 emits a light at least twice as bright as normal. On the other hand, if the d-c power supply were to fail or if the thyristor 23 were not turned off, the capacitor 51 will remain discharged which causes the neon light 55 to go out. Thus the monitor 50 is able to discriminate between two different kinds of malfunctions: a loss of control signals is discerned by an abnormally bright light; a failure of the d-c power supply results in the light going out.

Figure 3:
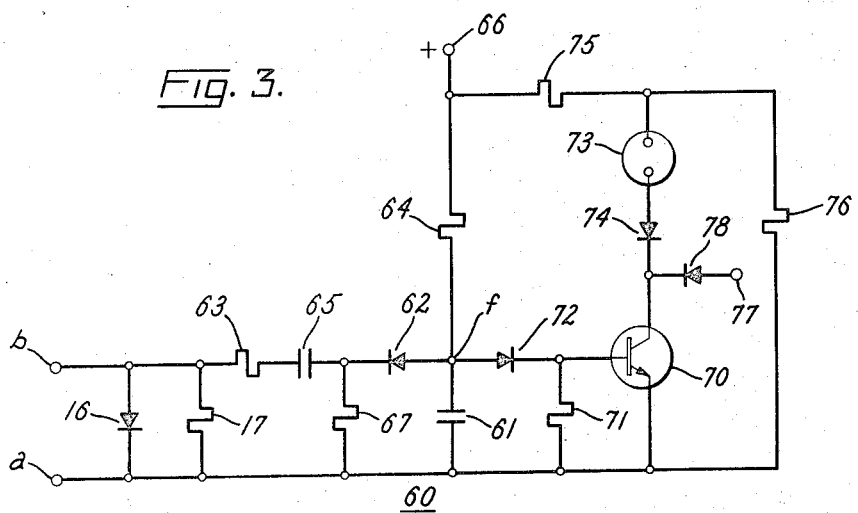
FIG. 3 is a schematic diagram of an alternative embodiment of the monitor.

In FIG. 3 I have illustrated an addtional variant 60 of a monitoring circuit that can be used in conjunction with the pulse forming network of FIG. 1. The monitor 60 is seen to comprise a capacitor 61 which, by way of a diode 62, a resistor 63, and another capacitor 65, is connected across the load terminals a and b of the pulse forming network 12. One plate of the capacitor 61 is connected directly to the grounded terminal a, and the other plate is connected via a terminal f to the anode of the diode 62 which is poled so that each time a control signal triggers the pulse forming network and the capacitor 21 consequently discharges to supply a current pulse to the load, the capacitor 61 quickly charges to a voltage having an appreciable magnitude and a predetermined polarity. In this case the voltage of terminal f will be negative with respect to ground.

The capacitor 65 is provided to divide the voltage that the pulse forming network periodically imposes on the load terminals a and b, whereby the magnitude of the voltage to which the capacitor 61 is charged is less than the voltage across the capacitor 21 when fully charged. Preferably the capacitance of the capacitor 65 is substantially smaller (e.g., 20%) than that of the capacitor 61. The ohmic value of the resistor 63 is relatively low (e.g., 10 ohms) to ensure fast charging of the capacitors 61 and 65 while limiting the amount of current that the monitor 60 diverts from the load 11. As is shown in FIG. 3, a diode 16 shunted by a resistor 17 is connected across the load terminals to conduct the current that recharges the capacitor 21 after the thyristor 23 is turned off by the commutating means in the pulse forming network (FIG. 1). A resistor 67 connected between the positive plate of the capacitor 65 and the grounded terminal a bleeds all of the charge off this capacitor during the intermittent intervals when the thyristor 23 is off.

The monitor 60 further comprises a discharge circuit which enables the capacitor 61 to slowly discharge during the intervals when the thyristor 23 is off. The discharge circuit includes a resistor 64 which is connected in series with the capacitor 61 between the terminal f and a relatively positive supply voltage terminal 66. The terminal 66 is adapted to be coupled to a suitable source of potential that is positive with respect to ground, and if desired this source can be the same as the d-c power supply that is used by the pulse forming network 12. The resistor 64 has a high ohmic value which gives the discharge circuit a relatively long time constant so that the capacitor 61 does not become fully discharged during the normal period between consecutive control signals. If, however, the period between control signals were to be abnormally extended, the capacitor 61 eventually will discharge fully, whereupon its discharge circuit is immediately effective to charge the capacitor 61 in the opposite sense, i.e., the voltage on terminal f begins increasing with positive polarity relative to ground.

In order to indicate whether or not the pulse forming network is functioning properly, the emitter-base junction of an NPN transistor 70 is connected across the capacitor 61 in the FIG. 3 embodiment of my invention. The emitter of the transistor 70 is connected directly to the grounded terminal a, and the emitter-base junction, which is shunted by a resistor 71, will therefore be reverse biased by the continuing presence of negative voltage at the terminal f. A diode 72 is connected between the terminal f and the base of the transistor 70 to block reverse current while the voltage on the terminal f is negative. The indicating means includes an element, such as the neon light 73 that is illustrated in FIG. 3, for emitting a perceptible signal when energized. The neon light 73, in series with a diode 74, is connected between the collector of the transistor 70 and the junction of a pair of voltage dividing resistors 75, 76 which in turn are connected between the positive supply voltage terminal 66 and the grounded terminal a. Thus the transistor 70 serves as a switch which is operative to connect the neon light 73 to a d-c power supply which will energize the light whenever the transistor is turned on due to its emitter-base junction being forward biased by the presence of positive voltage on the capacitor 61. With this arrangement, the proper functioning of the pulse forming network is indicated by the absence of a light signal. If desired, the on and off states of the transistor 70 can additionally be monitored by a suitable remote alarm or annunciator connected to its collector by means of a terminal 77 and an isolating diode 78.

In normal operation of the monitor 60 shown in FIG. 3, the pulses of electric current that the pulse forming network periodically supplies to the load circuit 11 quickly recharge the capacitor 61 so that the potential of terminal f is periodically driven to a level appreciably more negative than ground. During the intermittent intervals between such pulses, the capacitor 61 partially discharges through the resistor 64. So long as the repetition rate of consecutive pulses is higher than a predetermined frequency, the capacitor 61 is repeatedly recharged before it ever becomes fully discharged, and consequently a negative voltage is continuously present at the terminal f. In response to this voltage the transistor 45 remains reverse biased, thereby preventing energization of the neon light 73. If the pulse forming network were to stop supplying pulses to the load circuit, the capacitor 61 of the monitor 60 will soon become fully discharged and the polarity of the voltage on terminal f will change from negative to positive, whereupon the transistor 70 turns on to complete the connection of the neon light 73 to the d-c power supply. Consequently the light 73 turns on to indicate a malfunction.

While I have shown and described several forms of my invention by way of illustration, other modifications will occur to those skilled in the art. For example, a solid-state light emitting diode can be used in lieu of the neon light that is disclosed herein. I therefore contemplate by the claims which conclude the specification to cover all such modification as fall within the true spirit and scope of my invention.

What I claim as new and desire to secure by Letters Patent of the United States is:

1. For monitoring the operation of a repetitive pulse forming network which is designed to supply a load circuit with short pulses of electric current at a frequency corresponding to the frequency of a train of periodic control signals, said network comprising a first capacitor, means for coupling said first capacitor in series circuit relationship with the load circuit to a d-c power supply from which said first capacitor accumulates a charge, controllable switching means which is turned on by said control signals to provide a low-resistance path for discharging said first capacitor, through the load circuit, and commutating means operative in delayed response to turn on of said switching means for turning off said switching means, whereupon said switching means remains off until the next control signal is received and said d-c power supply recharges said first capacitor, the improvement comprising:
   a. a second capacitor;
   b. means for connecting said second capacitor in parallel with said load circuit so that each time said switching means is turned on to discharge said first capacitor through said load circuit said second capacitor charges to a voltage having an appreciable magnitude and a predetermined polarity;
   c. a discharge circuit including a resistor in series with said second capacitor and having a relatively long time constant so that during the intervals when said switching means is off said second capacitor will slowly discharge, said discharge circuit requiring more time than the normal period between consecutive control signals to discharge fully said second capacitor; and
   d. means responsive to the continuing presence across said second capacitor of voltage of said predetermined polarity for indicating that the pulse forming network is functioning properly.

2. The improvement of claim 1 in which said indicating means comprises an element that emits a perceptible signal when energized, and means for energizing said element so long as voltage of said predetermined polarity is present across said second capacitor.

3. The improvement of claim 2 in which said element is a neon light.

4. The improvmenet of claim 2 in which said energizing means comprises a switch operative to connect said element in parallel circuit relationship with said first capacitor while voltage of said predetermined polarity is present across said second capacitor.

5. The improvement of claim 4 in which said switch is a transistor whose emitter-base junction is connected in said discharge circuit.

6. The improvement of claim 1 in which said indicating means comprises an element that emits a perceptible signal when energized and means for energizing said element if said second capacitor becomes fully discharged, whereby the proper functioning of said pulse forming network is indicated by the absence of said perceptible signal.

7. The improvement of claim 6 in which said discharge circuit includes said d-c power supply which is effective as soon as said second capacitor becomes fully discharged to charge said second capacitor to a voltage having a polarity opposite to said predetermined polarity, and in which said energizing means comprises a switch operative to connect said element to said d-c power supply whenever voltage of said opposite polarity is present across said second capacitor.

8. The improvement of claim 7 in which said switch is a transistor whose emitter-based junction is connected across said second capacitor.

9. For monitoring the operation of a repetitive pulse forming network which is designed to supply a load circuit with short pulses of electric current at a frequency corresponding to the frequency of a train of periodic control signals, said network comprising a first capacitor, means for coupling said first capacitor in series circuit relationship with the load circuit to a d-c power supply from which said first capacitor accumulates a charge, controllable switching means which is turned on by said control signals to provide a low-resistance path for discharging said first capacitor through the load circuit, and commutating means operative in delayed response to turn on of said switching means for turning off said switching means, whereupon said switching means remains off until the next control signal is received and said d-c power supply recharges said first capacitor, the improvement comprising:
   a. a second capacitor;
   b. means for connecting said second capacitor in parallel with said first capacitor so that each time said switching means is turned on to discharge said first capacitor said second capacitor quickly discharges;
   c. a charging circuit including a resistor in series with said second capacitor and having a relatively long time constant so that during the intervals when said switching means is off said second capacitor will slowly recharge; and
   d. means responsive to the voltage across said second capacitor for indicating that the pulse forming network is functioning properly.

10. The improvement of claim 9 in which said indicating means comprises an element that emits a perceptible signal when energized and means for connecting said element in parallel circuit relationship with said second capacitor.

11. The improvement of claim 10 in which said charging circuit includes said d-c power supply and is effective to continuously raise the voltage across said second capacitor throughout the normal period between consecutive control signals, and in which the intensity of said perceptible signal is proportional to the average magnitude of the voltage across said second capacitor.

12. The improvement of claim 11 in which said element is a neon light.

* * * * *